Aug. 5, 1958  C. A. SJOQUIST  2,846,099
WHEEL JACK
Filed Feb. 13, 1957  3 Sheets-Sheet 1
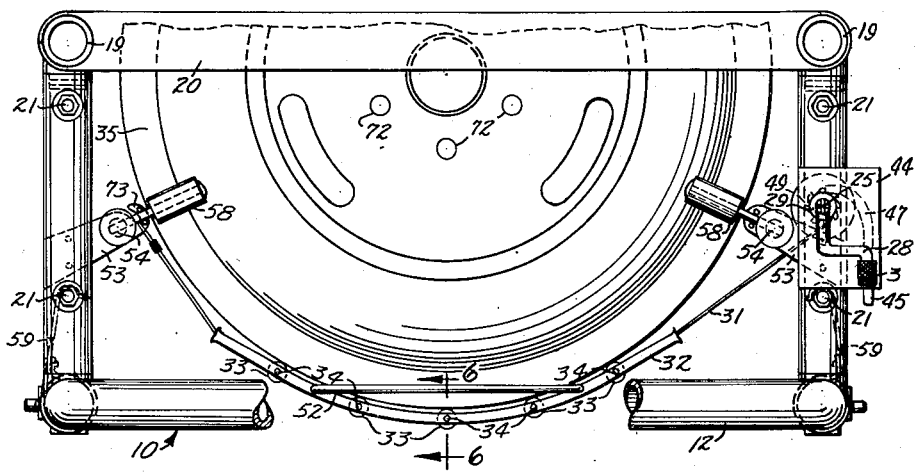
Fig. 1.
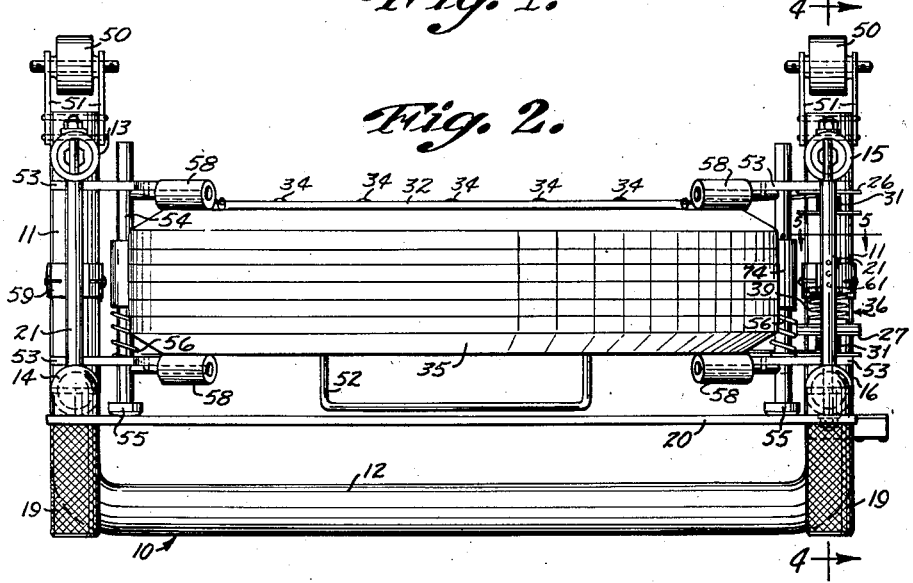
Fig. 2.
Fig. 6.
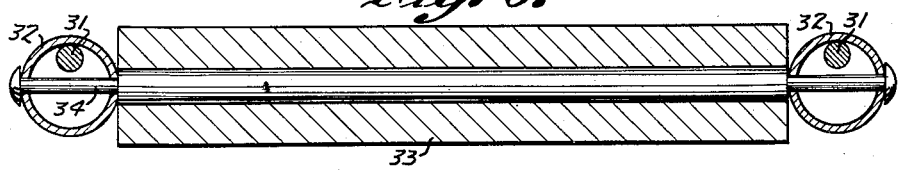
Fig. 8.
INVENTOR.
Carl A. Sjoquist
BY Victor J. Evans & Co.
ATTORNEYS Aug. 5, 1958  C. A. SJOQUIST  2,846,099
WHEEL JACK
Filed Feb. 13, 1957  3 Sheets-Sheet 2
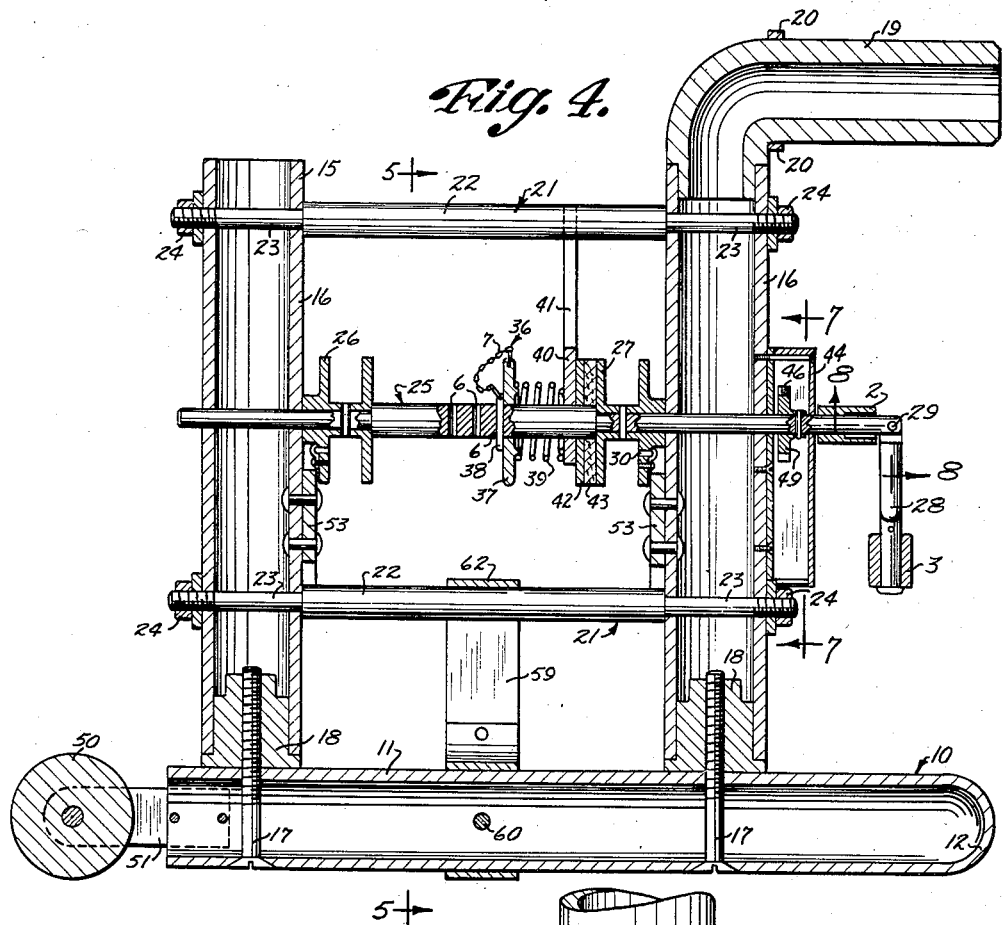
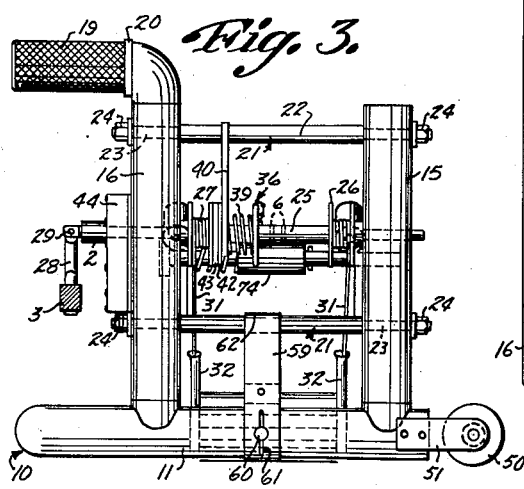
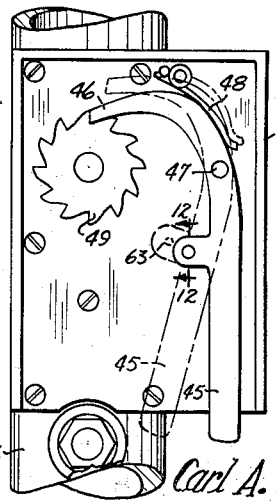
INVENTOR.
Carl A. Sjoquist.
BY Victor J. Evans & Co.
ATTORNEYS Aug. 5, 1958 C. A. SJOQUIST 2,846,099
WHEEL JACK
Filed Feb. 13, 1957 3 Sheets-Sheet 3
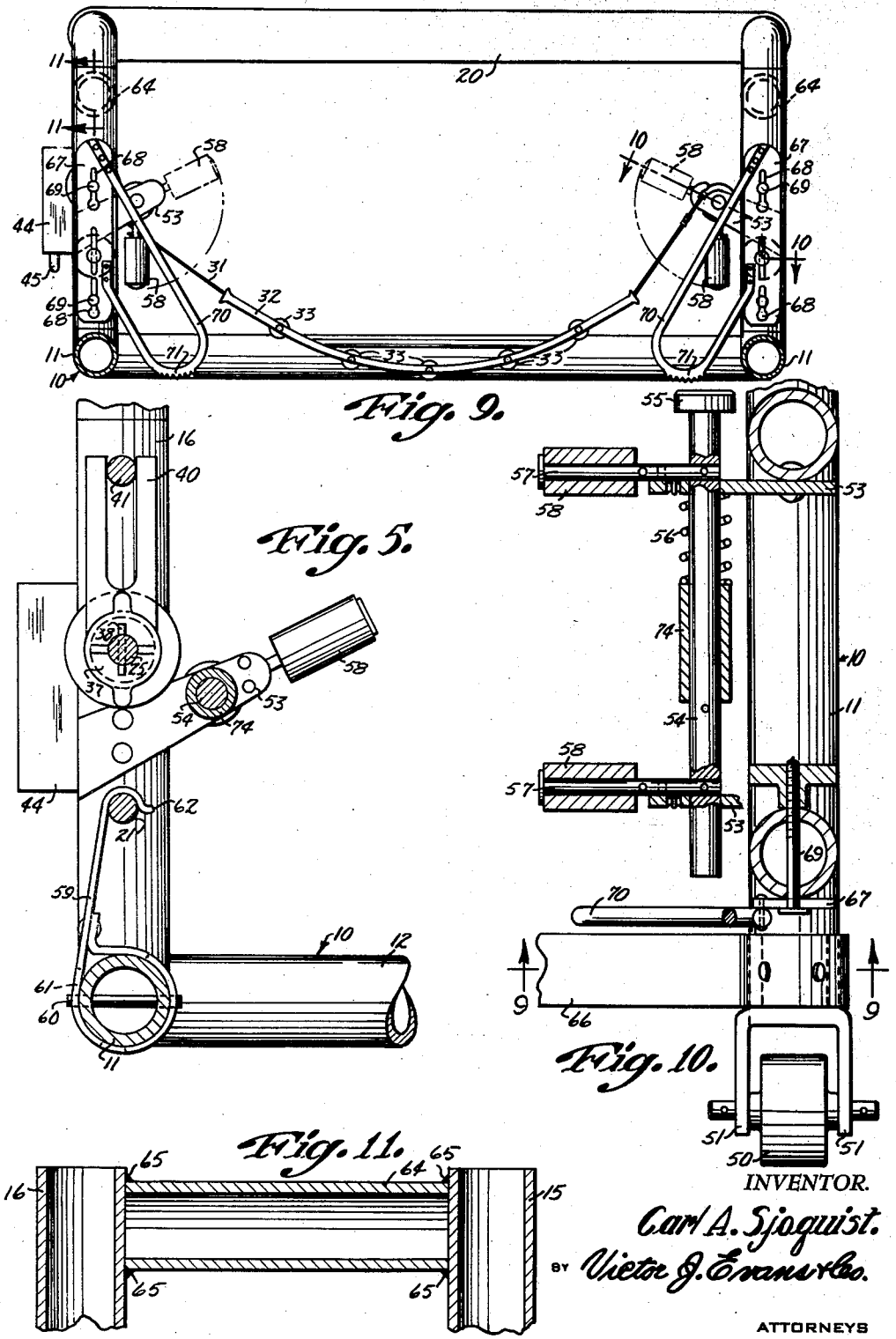
INVENTOR.
Carl A. Sjoquist.
BY Victor J. Evans & Co.
ATTORNEYS

United States Patent Office 2,846,099
Patented Aug. 5, 1958

2,846,099

WHEEL JACK

Carl A. Sjoquist, Cranston, R. I.

Application February 13, 1957, Serial No. 639,929

3 Claims. (Cl. 214—331)

This invention relates to a jack or hoist, and more particularly to a jack for use in handling vehicle wheels.

The object of this invention is to provide a jack which will facilitate the handling of vehicle wheels as when the vehicle wheels are to be moved from place to place.

Another object of the invention is to provide a vehicle jack which will facilitate the removal or replacement of vehicle wheels as when the wheels are being rotated or switched or otherwise removed or replaced, the jack including a means for raising or lowering the vehicle wheels so that the job of placing the wheel on the vehicle axle will be facilitated.

A still further object of the invention is to provide a wheel jack which can be moved from place to place as desired, the jack including an adjustable brake mechanism which permits the vehicle wheel to be lowered at different speeds, the jack accommodating wheels of different sizes.

A further object of the invention is to provide a wheel jack which is extremely simple and inexpensive to manufacture.

Other objects and advantages will be apparent in the course of the following description.

In the accompanying drawings, forming a part of this application, and in which like numerals are used to designate like parts throughout the same.

Figure 1 is a front elevational view showing a wheel positioned in the jack of the present invention.

Figure 2 is a top plan view of the assembly in Figure 1.

Figure 3 is a side elevational view of the wheel jack.

Figure 4 is an enlarged sectional view taken on the line 4—4 of Figure 2.

Figure 5 is a sectional view taken on the line 5—5 of Figure 4.

Figure 6 is a sectional view taken on the line 6—6 of Figure 1.

Figure 7 is a sectional view taken on the line 7—7 of Figure 4.

Figure 8 is a sectional view taken on the line 8—8 of Figure 4.

Figure 9 is a sectional view taken on the line 9—9 of Figure 10.

Figure 10 is a sectional view taken on the line 10—10 of Figure 9.

Figure 11 is a sectional view taken on the line 11—11 of Figure 9.

Figure 12 is a sectional view taken on the line 12—12 of Figure 7.

Referring in detail to the drawings, the numeral 10 designates a horizontally disposed U-shaped base which includes a pair of spaced parallel legs 11 which are connected together by a cross-piece or web 12. Extending upwardly from the base 10 and secured thereto is a plurality of vertically disposed spaced parallel posts 13, 14, 15 and 16. For securing the posts to the base, there is provided suitable securing elements such as bolts 17 which extend upwardly from the base and engage lugs 18 that are seated in the lower end of the posts, Figure 4.

Extending outwardly from the upper ends of the posts 14 and 16 are a pair of handles 19, and the handles 19 may be knurled exteriorly as shown in Figure 2 so as to insure that a firm grip can be gotten on the handles. A plate 20 extends between the pair of handles 19.

Extending between the posts 13 and 14 and between the posts 15 and 16 is a plurality of rods 21, which each include an intermediate enlarged portion 22 and reduced diameter portions 23. Nuts 24 are arranged in threaded engagement with the ends of the rods 21 for maintaining the parts in their proper assembled positions. Journaled between the pair of posts 15 and 16 is a shaft 25 which has a pair of reels or spools 26 and 27 mounted thereon. A handle member 28 is adjustably or pivotally connected to the front end of the shaft 25 by means of a pivot pin 29. There is further provided a pair of cables 31 which are arranged in spaced parallel relation with respect to each other, and cables 31 are trained over and connected to the spools 26 and 27, there being apertures 30 in the spools or reels 26 and 27 whereby ends of the cables 31 can be readily connected to the spools. The cables 31 extend through curved tubes 32, and the pair of tubes 32 support a plurality of spaced parallel rollers 33, Figure 6, the rollers 33 being mounted on rods 34 which extend between the tubes 32. The rollers 33 are adapted to support a vehicle wheel 35, Figures 1 and 2.

There is further provided a brake mechanism which is indicated generally by the numeral 36, Figure 4, and the brake mechanism is adapted to be used for controlling the rate of rotation of the shaft 25 so that the wheel 35 will not drop or lower too fast. The brake mechanism 36 includes a plate 37 which is mounted on the shaft 25, and there is further provided a removable pin 38 which extends through one of a plurality of openings 6 in the shaft 25 so that by removing the pin 38, the position of the plate 37 on the shaft 25 can be adjusted or varied as desired, whereby the braking action can be regulated or controlled. The pin 38 is supported by a chain 7. A coil spring 39 is circumposed on the shaft 25, and the coil spring 39 abuts the plate 37. The coil spring 39 also engages an arm 40 which is provided with a slot 41 through which extends the rod 21 that is arranged thereabove. The arm 40 engages or abutts a disk 42 which is arranged contiguous to a washer 43 which may be made of any suitable material such as leather, and the washer 43 is arranged contiguous to the outer surface of the spool or reel 27.

Secured to the outer surface of the post 16 is a gear box or housing 44 which has a movable lever 45 arranged therein. The lever 45 includes a finger 46 which is mounted for movement into and out of engagement with the teeth of a gear 49, and the gear 49 is mounted on the shaft 25. The lever 45 is pivotally connected to the housing 44 through the medium of a pivot pin 47, and a spring member 48 is arranged in engagement with the lever 45.

The jack of the present invention can be moved from place to place as desired, and for permitting the movement of the jack, there is provided wheels or rollers 50 which are journaled between plates or brackets 51, the plates 51 being secured to the ends of the legs 11. A handle piece 52 may be secured to one of the tubes 32 for facilitating the manual moving of the jack.

Extending upwardly and inwardly from the posts are inclined plates or brackets 53 which support movable plungers or rods 54, Figure 10. Each plunger 54 has a head or knob 55 on its outer end whereby the plungers can be manually moved, and a coil spring 56 is circumposed on each plunger 54. Extending outwardly from each plunger 54 and carried thereby is a pair of pins 57, and the roller 58 is mounted on each pin 57. The rollers 58 are adapted to engage the side portions of the vehicle wheel 35 so as to help maintain the vehicle wheel in its proper position on the jack. By manually gripping the knob 55, the plungers 54 can be rotated so that the roller 58 can be moved into and out of engagement with the vehicle wheels. Straps 59 are arranged in engagement with the legs 11, and the straps 59 may be provided with slots 61 through which extend the pin 60, the straps 59 being provided with curved portions 62 which are mounted for movement into and out of engagement with the rods 21 thereabove, Figure 1.

There is further provided a spring pressed detent mechanism which is indicated generally by the numeral 63, and the detent mechanism 63 is shown in detail in Figure 12. The detent 63 is adapted to be used for retaining the lever 45 in its adjusted position so that accidental shifting of the lever 45 is prevented.

Referring to Figures 9, 10 and 11 of the drawings, there is shown a modification wherein the frame may be made of pipe which is welded together as an alternate construction. Thus, in Figures 9, 10 and 11 braces 64 may extend between the posts, and braces 64 adapted to be used in lieu of the previously described rods 21. The arrangement shown in the Figures 9, 10 and 11 is provided with a means for preventing accidental movement of the jack, and this means comprises vertically adjustable or shiftable plates 67 which are provided with slots 68 whereby suitable securing elements such as bolt and nut assemblies 69 can be extended through the slots 68 and into engagement with certain of the posts. The plates 67 carry brackets 70 which may have a substantial U-shape, Figure 9, and the brackets 70 are provided with teeth or serrations 71 so that by lowering the brackets 70 until the teeth 71 engage the ground, accidental shifting of the jack will be prevented.

From the foregoing, it is apparent that there has been provided a jack or hoist which is especially suitable for use in handling vehicle wheels such as the wheel 35. By means of the present invention the wheel 35 can be readily moved from place to place so that the wheel lug openings 72 for example can be properly aligned with the necessary lugs or bolts. In use, the wheel 35 is positioned on the roller 33 while the rollers 33 and cables 31 are in their lowered position. Then, by gripping the handle member 28, the shaft 25 can be rotated whereby the pair of reels 26 and 27 will be turned or rotated and this will cause the cables 31 to become wound on the reels 26 and 27. As the cables 31 become wound on the reels 26 and 27, the cables will move upwardly to thereby raise rollers 33 whereby the wheel 35 will be raised or lifted since the wheel 35 is supported on the rollers 33. The shaft 25 can be rotated until the wheel 35 is elevated to the desired height. The ratchet arrangement shown in Figure 7 prevents the shaft 25 from rotating in the wrong direction and the ratchet arrangement includes the lever 45 which has the finger or dog 46 engaging the teeth of the gear 49. The lever 45 is normally urged to the solid line position shown in Figure 7 by means of the spring member 48. However, when it is desired to lower the wheel 35, it is only necessary to manually move the lever 45 from the solid line position shown in Figure 7 to the broken line position shown in Figure 7 and the detent mechanism 63 will release the lever 45 when sufficient manual pressure is pressed on the lever 45. Thus, by moving the lever 45 to the broken line position in Figure 7, the finger 46 will be out of engagement with the gear 49 so that the shaft 25 is free to rotate in the reverse direction whereby the weight of the wheel 35 will lower the cables 31 so that for example the wheel can be readily removed from the jack. In order to prevent the wheel 35 and the associated parts of the jack from lowering too fast, there is provided the previously described brake mechanism 36. Thus, the brake mechanism includes the spring 39 which urges the washer 43 against the reel 27 whereby the braking action will be provided so that the shaft 25 will not rotate too fast. By moving the pin 38, the amount of pressure exerted by the spring 39 can be regulated or varied so that the brake action can be regulated or controlled whereby the speed with which the wheel is lowered can be readily controlled.

The ends of the cables 31 can be connected to openings 30 in the spools 26 and 27, while the other ends of the cables 31 are adapted to be connected to suitable hooks 73. Due to the provision of the wheels 50, the jack can be readily gripped by the handles 19 and moved from place to place. Furthermore, there is provided the rollers 58 which can be moved from the solid line position shown in Figure 9 to the broken line position shown in Figure 9 when desired. Thus, the rollers 58 in their raised position will help maintain the wheel 35 in its proper position on the jack, but when desired, the plungers 54 can be readily gripped by the knobs 55 and then rotated so as to swing the pins 57 which carry the rollers 58. Due to the provision of the pivot pin 29 shown in Figure 8, the handles 28 can be moved to a folded position so as to occupy a minimum amount of space for storage or shipment.

The jack of the present invention can be used for handling wheels on trucks, automobiles, busses or other vehicles, and with the present invention switching of tires and wheels will be simplified. With the present invention it is not necessary to manually lift the tires or wheels since the jack will take care of the lifting of the wheels. Furthermore, the device can be readily disassembled, so that the jack can be placed in the trunk of a vehicle. When the jack is assembled, the wheel can be rolled onto the rollers 33 with the rollers lying flat on the ground and then the wheels can be properly lined up. Then by pulling out on the plungers 54 the coil spring 56 will be compressed so that the plungers 54 can be rotated whereby the rollers 58 will move up and engage the sides of the wheel 35 so as to lock the wheel in place. Then, the handle 28 is moved from the position shown in Figure 4 to the position shown in Figure 8 so that the shaft 25 can be rotated in order to raise the tire and wheel 35 up. After the wheel 35 has been raised to the proper level, the wheel is slid off or moved off of the jack so that the wheel holes 72 will be aligned with the lugs on the vehicle and then the usual nuts can be replaced on the lugs or bolts so that the jack can be removed. After the jack has been removed the nuts can be tightened by means of a wrench or the like so as to retain the wheel in its proper position on the vehicle.

The parts can be made of any suitable material and in any shape or size. The posts may be secured to the base in any suitable manner, such as for example by means of the bolts 17 and 18, or as shown in Figures 9 through 11 the parts may be welded together. The various posts may be maintained in their proper spaced apart relationship by means of the rods 21 or by means of the braces 64. The straps 59 can be moved into and out of engagement with the rods 21 due to the position of the pin 60 which extends through the slot 61. The plate or brace 20 helps maintain the posts 14 and 16 in their proper position, and the wheels 50 can be used for facilitating the movement of the jack to a desired location. By means of the hande piece 52 the wheel 35 can be shifted slightly or moved slightly so as to help to line up the wheel. When the rollers 58 are not being used, the rollers 58 can be moved to the downward position as shown in solid lines in Figure 9. As previously described, the crank or handle 28 can be folded to an out of the way position when not being used. The leather washer 43 acts as a brake against the spool 27 and the spring 39 puts pressure on the washer 43. Due to the provision of the pin 38, the amount of pressure exerted by the spring 39 can be varied and the brake 36 is only used when the wheel is to be lowered and when the wheel is to be lowered the lever 45 is moved. As a general rule the brake 36 would not be used since ordinarily it would not be necessary to lower the wheel. By loosening the bolts 69 shown in Figures 9 and 10, the plates 67 can be moved up and down so that the teeth 71 can be brought into engagement with the ground whereby accidental shifting of the jack is prevented. The construction shown in Figure 9 is especially suitable when handling heavier truck wheels. The plungers 54 may be supported by bearing blocks or collars 74.

The straps 59 serve to maintain the base 10 connected to the posts such as posts 13, 14, 15 and 16. Thus, the strap 59 clamps on to the rods 21 whereby the posts will be secured to the legs which are part of the U-shaped base. The device can be readily disassembled when desired, so that it will occupy a minimum amount of space for storage or shipment.

The posts such as the posts 15 and 16 are slidably mounted on the nuts or lugs 18 and the lugs 18 are connected to the U-shaped base 10 by means of the bolts 17. Similarly, the posts 13 and 14 are slidably connected to the lugs which are connected to the U-shaped base. The plate 20 extends between the handles 19 and this plate 20 is slidably mounted on the handles so that it can be removed when desired. The pin 38 is adapted to be extended through any of the holes or openings 6 which extend through the shaft 25 and the pin 38 is connected to a chain 7, while the other end of the chain may be connected to the plate 37. Thus, the pin 38 is seated in any of the openings 6 and since the chain 7 is connected to the pin, the pin will not be misplaced or lost.

As shown in Figure 8, the numeral 2 indicates the sleeve or collar which slides over the pivot pin 29, and this collar serves to hold the handle 28 stationary. The handle 28 is further provided with a roller 3 which can be made of any suitable material such as metal or wood.

What is claimed is:

1. In a wheel jack, a frame including a U-shaped base including a pair of spaced parallel legs, a web extending between said legs, front and rear vertically disposed posts extending upwardly from each of said legs and secured thereto, horizontally disposed spaced parallel rods extending between said front and rear posts and secured thereto, a shaft journaled between a set of front and rear posts, a handle connected to the outer end of said shaft, a pair of reels mounted on said shaft, a pair of spaced parallel cables having their ends connected to said reels, a pair of tubes arranged in spaced parallel relation in respect to each other and having said cables extending therethrough, a plurality of rollers extending between said tubes and supported thereby, a handle piece connected to said posts, inclined brackets secured to said posts, a spring pressed manually operable plunger adjustably connected to each pair of brackets, and a pair of roller members carried by each of said plungers for engagement with a side of a tire.

2. In a wheel jack, a frame including a U-shaped base including a pair of spaced parallel legs, a web extending between said legs, front and rear vertically disposed posts extending upwardly from each of said legs and secured thereto, horizontally disposed spaced parallel rods extending between said front and rear posts and secured thereto, a shaft journaled between a set of front and rear posts, a handle connected to the outer end of said shaft, a pair of reels mounted on said shaft, a pair of spaced parallel cables having their ends connected to said reels, a pair of tubes arranged in spaced parallel relation in respect to each other and having said cables extending therethrough, a plurality of rollers extending between said tubes and supported thereby, a handle piece connected to said posts, inclined brackets secured to said posts, a spring pressed manually operable plunger adjustably connected to each pair of brackets, and a pair of roller members carried by each of said plungers for engagement with a side of a tire, and wheels connected to the ends of said legs.

3. The structure as defined in claim 2 and further including a brake mechanism connected to said shaft.

References Cited in the file of this patent

UNITED STATES PATENTS

| | | |
|---|---|---|
| 2,444,992 | Kittel | July 13, 1948 |
| 2,725,997 | Shvetz | Dec. 6, 1955 |